US010352343B2

(12) United States Patent
Milner et al.

(10) Patent No.: US 10,352,343 B2
(45) Date of Patent: Jul. 16, 2019

(54) MOUNTING FIXTURE OF A CONNECTION FIXTURE

(71) Applicants: Wayne Russell Milner, Burnside Heights (AU); Rudolf Alexander Diener, Doonside (AU)

(72) Inventors: Wayne Russell Milner, Burnside Heights (AU); Rudolf Alexander Diener, Doonside (AU)

(*) Notice: Subject to any disclaimer, the term of this patent is extended or adjusted under 35 U.S.C. 154(b) by 0 days.

(21) Appl. No.: 15/598,695

(22) Filed: May 18, 2017

(65) Prior Publication Data

US 2017/0254347 A1 Sep. 7, 2017

Related U.S. Application Data

(63) Continuation-in-part of application No. PCT/AU2015/000668, filed on Nov. 5, 2015.

(30) Foreign Application Priority Data

| Nov. 24, 2014 | (AU) | 2014904736 |
| Mar. 3, 2015 | (AU) | 2015900737 |
| Jun. 5, 2015 | (AU) | 2015902114 |

(51) Int. Cl.
*F16B 7/04* (2006.01)
*E04F 11/18* (2006.01)
(Continued)

(52) U.S. Cl.
CPC ............ *F16B 7/0486* (2013.01); *E04F 11/18* (2013.01); *E04F 11/1817* (2013.01);
(Continued)

(58) Field of Classification Search
CPC ........ F16B 7/0426; F16B 7/0486; F16B 2/10; E04G 7/20; E04G 7/14; E04F 11/1817; F16L 3/1083; B63B 17/04
See application file for complete search history.

(56) References Cited

U.S. PATENT DOCUMENTS

| 1,831,641 A | * | 11/1931 | Skinner | F16L 3/1083 |
| | | | | 277/606 |
| 1,857,022 A | * | 5/1932 | Hingley | E04G 7/20 |
| | | | | 403/305 |

(Continued)

FOREIGN PATENT DOCUMENTS

| AU | 2014202262 A1 * | 11/2015 | ............... E04G 7/20 |
| DE | 9310790 U1 * | 9/1993 | .............. B62J 11/00 |

(Continued)

OTHER PUBLICATIONS

International Search Report issued in related International Patent Application No. PCT/AU2015/000668, dated Jan. 15, 2016.

*Primary Examiner* — Eret C McNichols
(74) *Attorney, Agent, or Firm* — Foley & Lardner LLP

(57) ABSTRACT

A mounting fixture for interconnecting at least two tubular members, the mounting fixture including:
 at least one first connection section including a first connection aperture for receipt of a connector configured to secure a receiving element to the mounting fixture via a second connection aperture of the receiving element;
 a mounting sleeve configured to be secured around a section of a tubular member, the mounting sleeve comprises at least two interconnectable fixture sections, each fixture section comprising a portion of the mounting fixture which includes a section of the mounting sleeve and a portion of the first connection section; and
 at least one connecting arrangement for interconnecting adjacent fixture sections to form the mounting sleeve, each connecting arrangement being located on or within an inner side of each fixture section of the mounting sleeve to interconnect each fixture section to (Continued)

an adjoining fixture section at a location on or within an inner side of the mounting sleeve.

3 Claims, 7 Drawing Sheets

(51) Int. Cl.
  *E04H 17/14* (2006.01)
  *F16B 2/10* (2006.01)
(52) U.S. Cl.
  CPC ...... *E04H 17/14* (2013.01); *E04F 2011/1819* (2013.01); *E04F 2011/1821* (2013.01); *E04F 2011/1868* (2013.01); *E04H 2017/1482* (2013.01); *F16B 2/10* (2013.01)

(56) References Cited

U.S. PATENT DOCUMENTS

| | | | | |
|---|---|---|---|---|
| 3,352,582 | A | * 11/1967 | Mankin | F16L 3/01 248/75 |
| 4,624,374 | A | 11/1986 | Murtaugh | |
| 5,211,502 | A | 5/1993 | Upham-Hill | |
| 5,358,283 | A | * 10/1994 | Silva | F16L 21/06 285/24 |
| 5,413,063 | A | * 5/1995 | King | B63B 17/04 114/221 R |
| 2006/0035507 | A1* | 2/2006 | Miles | F16L 3/1008 439/367 |
| 2008/0019794 | A1* | 1/2008 | van Walraven | F16B 2/10 411/175 |
| 2009/0078831 | A1* | 3/2009 | Spreitzer | F16L 3/1083 248/49 |
| 2009/0230627 | A1* | 9/2009 | King, Jr. | F16L 3/1075 277/314 |
| 2013/0075540 | A1* | 3/2013 | Hammond | F16L 3/1008 248/62 |
| 2015/0083462 | A1* | 3/2015 | Yoshida | F16B 2/06 174/136 |
| 2015/0240846 | A1* | 8/2015 | Rogers | F16B 2/10 248/230.4 |
| 2016/0131168 | A1* | 5/2016 | Courtin | F16B 7/0486 403/187 |
| 2016/0131281 | A1* | 5/2016 | Juzak | F16B 35/06 248/74.3 |
| 2016/0278589 | A1* | 9/2016 | Reed | A47K 17/022 |
| 2017/0254347 | A1* | 9/2017 | Milner | E04F 11/1817 |
| 2018/0010624 | A1* | 1/2018 | Schlitter | F16B 12/40 |
| 2018/0058073 | A1* | 3/2018 | Vater | E04F 11/1817 |

FOREIGN PATENT DOCUMENTS

| | | | | |
|---|---|---|---|---|
| DE | 9414312 | U1 * | 10/1994 | F16L 3/11 |
| DE | 102010053357 | A1 * | 2/2012 | F16L 3/1008 |
| EP | 2204588 | A1 * | 7/2010 | A47G 25/0664 |
| EP | 2985500 | B1 * | 10/2016 | F16L 3/1008 |
| FR | 806815 | A * | 12/1936 | F16L 3/1083 |
| FR | 1124461 | A * | 10/1956 | F16L 3/1083 |
| FR | 2558218 | A1 * | 7/1985 | E04G 7/20 |
| GB | 191213950 | A * | 6/1913 | F16L 3/1083 |
| GB | 451949 | A * | 8/1936 | E04G 7/20 |
| GB | 652676 | A * | 5/1951 | F16L 3/1083 |
| WO | WO 2001/77573 | A1 | 10/2001 | |
| WO | WO 2002/055916 | A2 | 7/2002 | |
| WO | WO 2009/126989 | A1 | 10/2009 | |

* cited by examiner

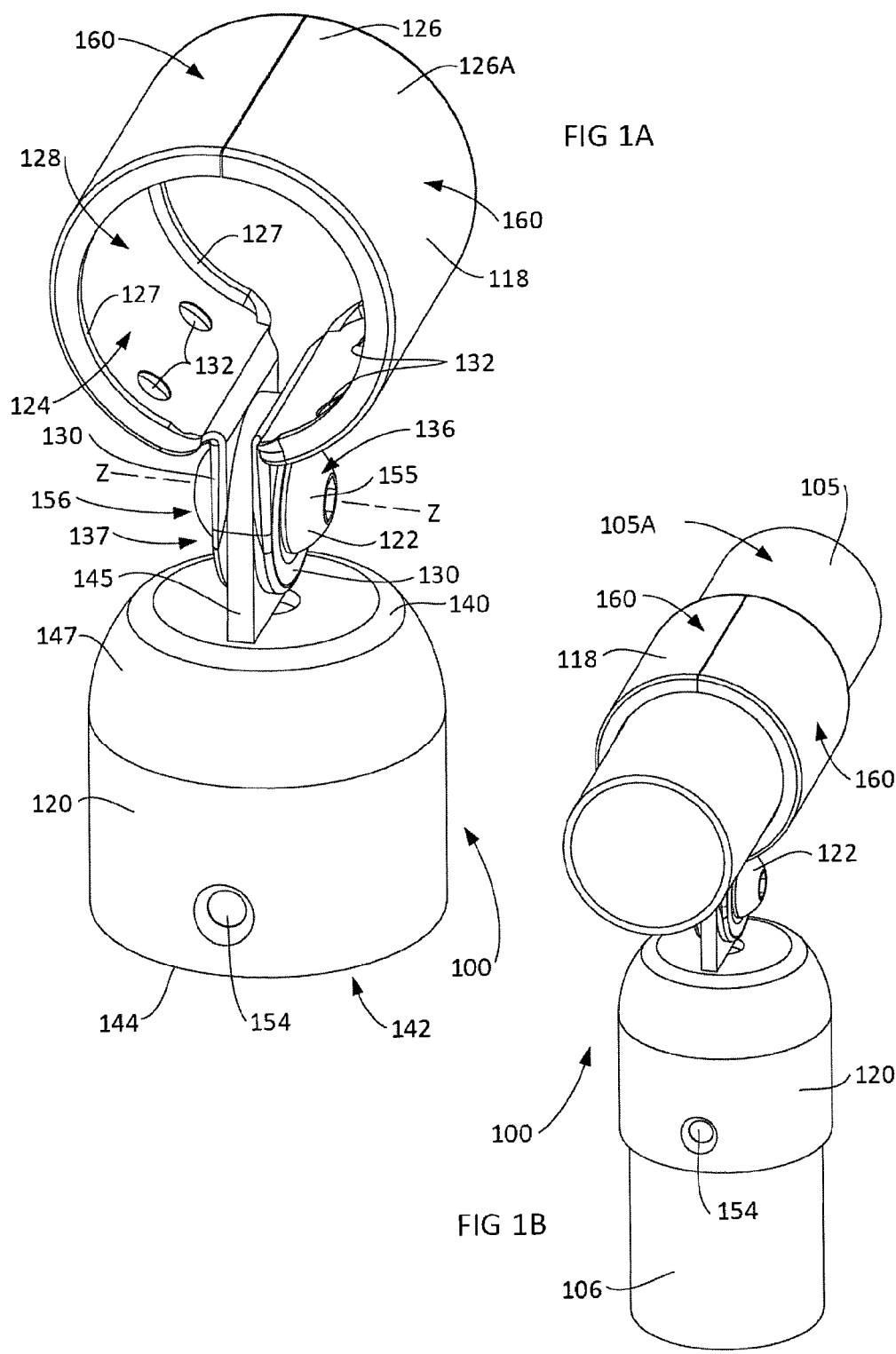

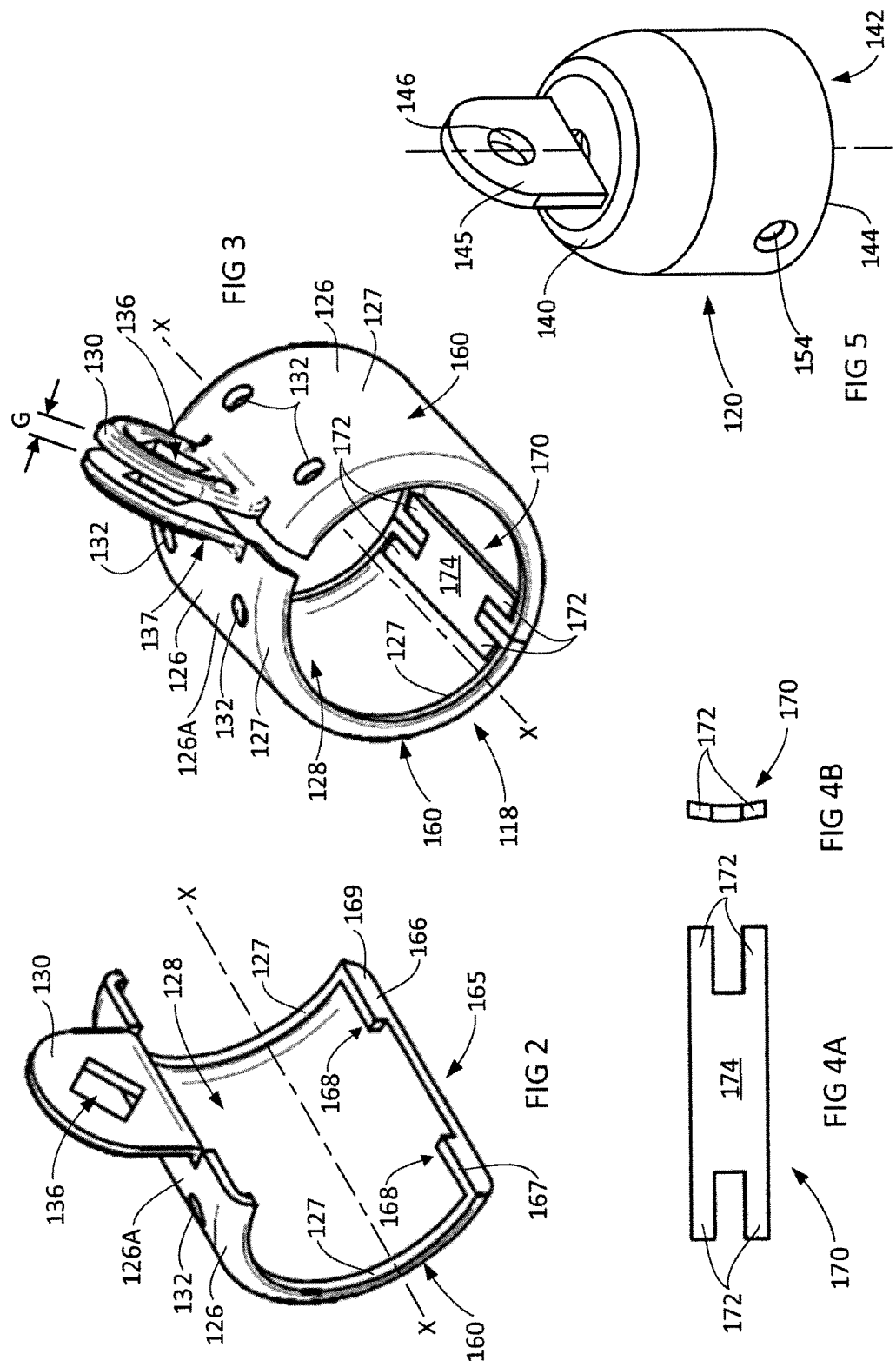

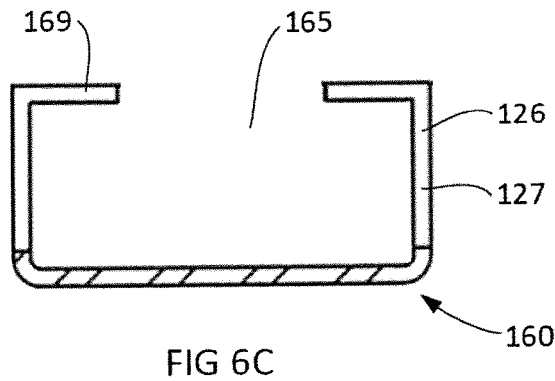
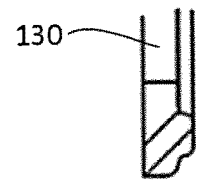
FIG 6C
FIG 6D
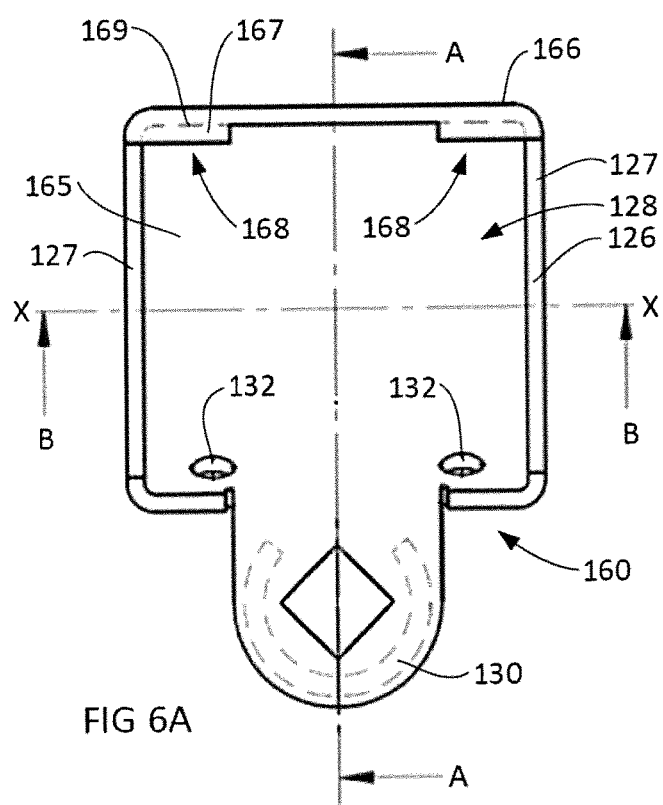
FIG 6A
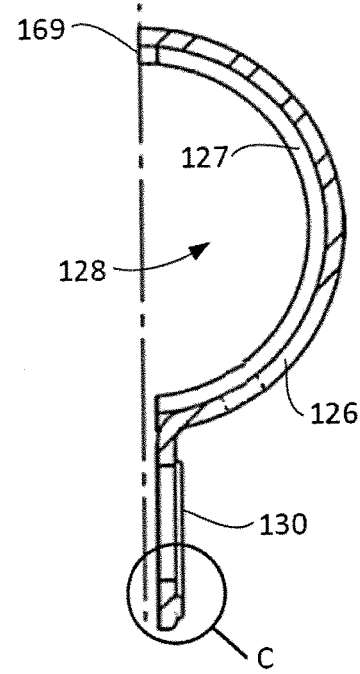
FIG 6B

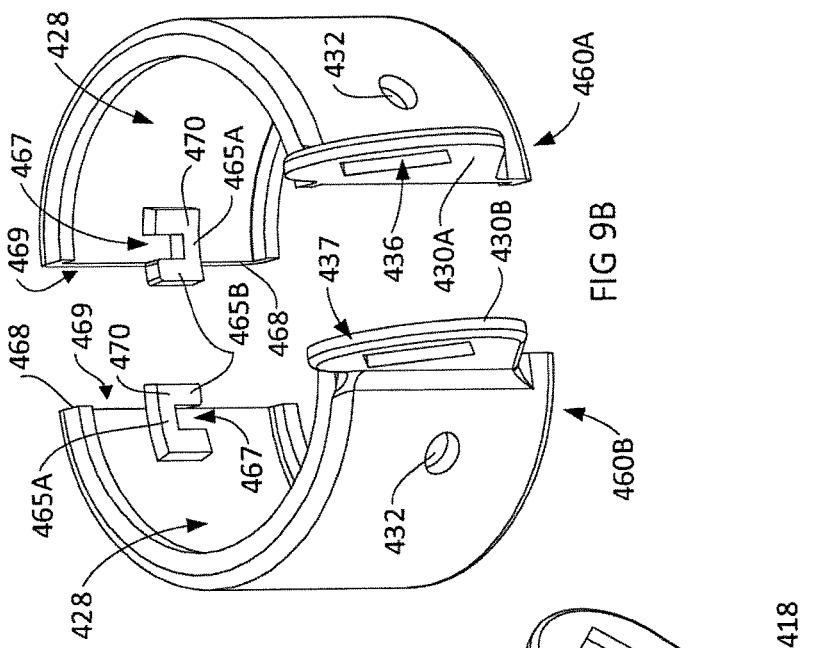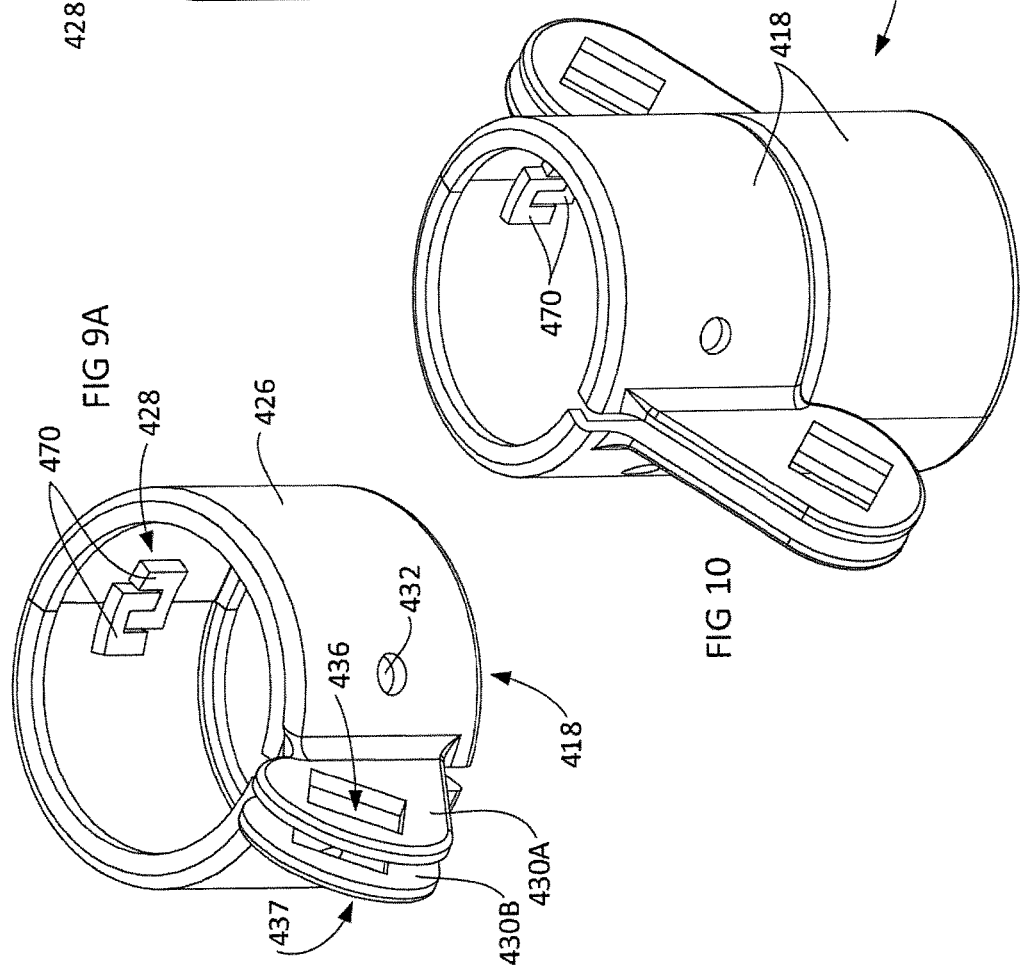

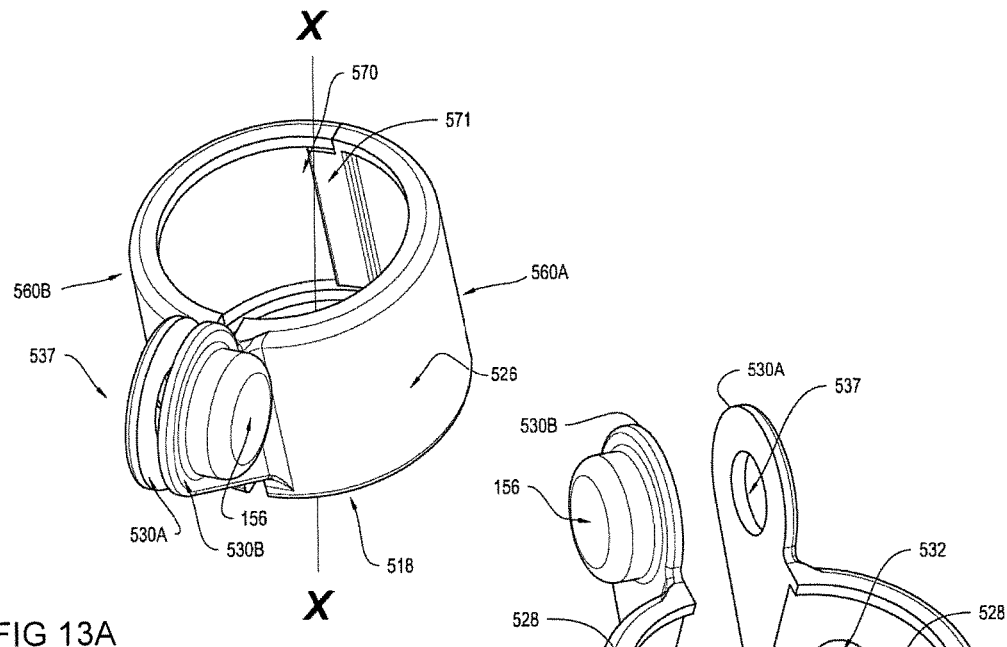
FIG 13A
FIG 13B
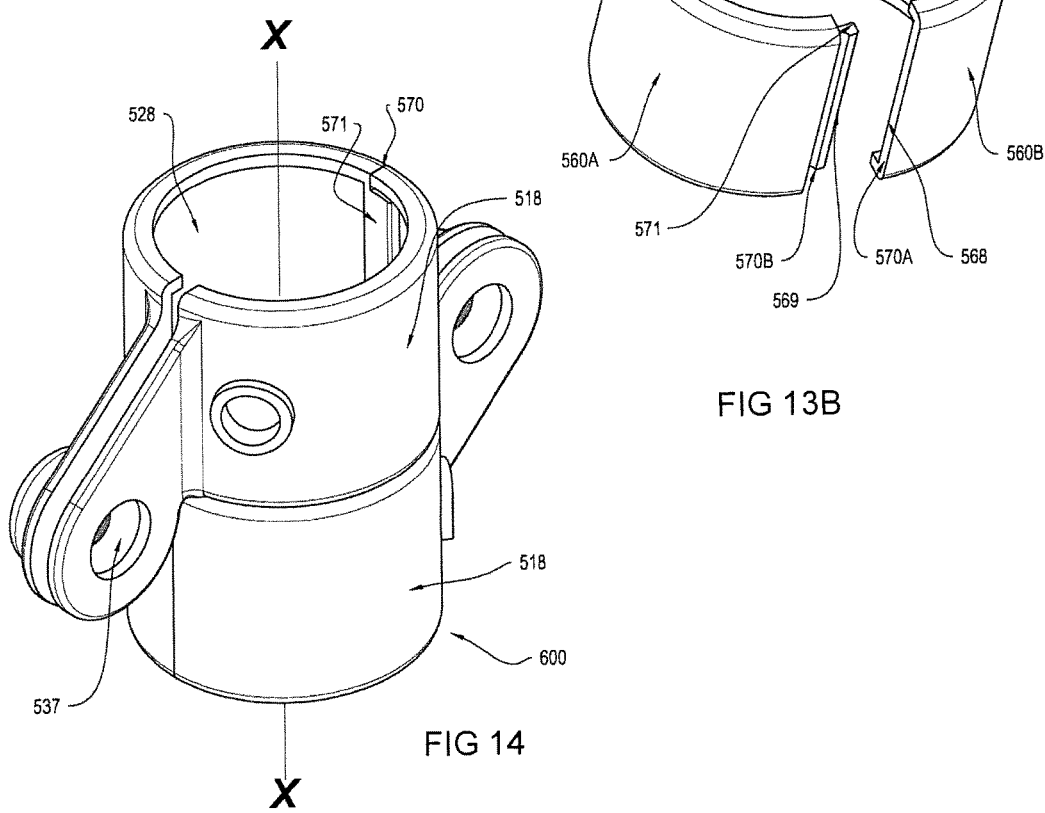
FIG 14

MOUNTING FIXTURE OF A CONNECTION FIXTURE

PRIORITY CROSS-REFERENCE

The present application claims priority from Australian provisional patent applications No. 2014904736 filed 24 Nov. 2014, No. 2015900737 filed 3 Mar. 2015 and No. 2015902114 filed 5 Jun. 2015.

TECHNICAL FIELD

The present invention generally relates to a mounting fixture for a connection fixture and a connection fixture including that mounting fixture. The invention is particularly applicable as part of an adjustable connection fixture for interconnecting tubular members of a fence structure or tubular railing sections of a hand rail and it can be convenient to hereinafter disclose the invention in relation to that exemplary application. However, it is to be appreciated that the invention is not limited to that application and could be used for connecting tubular sections in various other structures such as balustrades, railings, hand rails, or the like.

BACKGROUND TO THE INVENTION

The following discussion of the background to the invention is intended to facilitate an understanding of the invention. However, it should be appreciated that the discussion is not an acknowledgement or admission that any of the material referred to was published, known or part of the common general knowledge as at the priority date of the application.

Metal tubular fences and tubular hand rails are constructed from a plurality of tubular pipes which are interconnected using connection fixtures. A number of adjustable connection fixtures are currently available on the market, including connection fixtures taught in the Applicant's international publication WO2009/126989A1 and Australian Design Registration No. 328482.

Each of these prior connection fixtures comprise a tubular shaped mounting fixture configured to be secured around a section of a first tubular member and a pivotally interconnected tubular shaped receiving element configured to receive an end section of a second tubular member. Each mounting fixture is formed as unitary and/or integrally moulded element.

The moulding and transport costs of the large unitary tubular mounting fixture can be significant due to the overall size of the mounting fixture. It can therefore be advantageous to produce the mounting fixture in two or more interconnectable sections.

A number of two section mounting fixtures are currently available. These mounting fixtures generally comprise two sections interconnectable around a tubular member using at least one fastening bolt of screw inserted through an external fastening aperture or other similar arrangement.

One example is taught in U.S. Pat. No. 4,624,374A. This mounting fixture comprises a pair of elongated elements in adjustable angular relation includes a pair of cooperative clamping members adapted to be clamped in place on one of said elongated elements and a third member adapted to be secured to the other of said pair of elongated elements. The clamping members also include a pivot for supporting the third member of connector to permit angular adjustment between the pair of elongated elements when the connector members are clamped and secured in place. An external threaded screw fastener and cooperative external aperture arrangement is provided for interconnecting the second end portions of the opposing clamping members to move the clamping portions thereof into clamping engagement against the elongated element to secure the universal connector in place for angularly interconnecting the pair of elongated elements.

In U.S. Pat. No. 4,624,374A and prior connection arrangements of each of these two section mounting fixtures are externally visible and accessible when the mounting fixture is mounted on a tubular member. For example, in U.S. Pat. No. 4,624,374A the screw thread fastener can be accessed as it is on an outer side of the mounting fixture. Such an external connection enables unwanted tampering with the integrity of the mounting fixture, and may in many cases detract from the desired aesthetic appeal of the mounting fixtures and associated connection fixture.

It is therefore desirable to provide an alternative two section or multipart mounting fixture and a connection fixture which includes that two section or multipart mounting fixture.

SUMMARY OF THE INVENTION

A first aspect of the present invention provides a mounting fixture for interconnecting at least two tubular members, the mounting fixture including:

at least one first connection section including a first connection aperture for receipt of a connector configured to secure a receiving element to the mounting fixture via a second connection aperture of the receiving element;

a mounting sleeve configured to be secured around a section of a tubular member, the mounting sleeve comprises at least two interconnectable fixture sections, each fixture section comprising a portion of the mounting fixture which includes a section of the mounting sleeve and a portion of the first connection section; and at least one connecting arrangement for interconnecting adjacent fixture sections to form the mounting sleeve, each connecting arrangement being located on or within an inner side of each fixture section of the mounting sleeve to interconnect each fixture section to an adjoining fixture section at a location on or within an inner side of the mounting sleeve, wherein the connecting arrangement is positioned in the inner side of an inner side of each fixture section of the mounting sleeve such that the cooperating fixture sections connect together using a connection or connection element which is hidden from view when the mounting sleeve is mounted over a cooperating tubular member.

It should be appreciated that the inner side of the mounting sleeve and each comprising fixture section is that side of the mounting sleeve adjacent to and facing the tubular member when the mounting sleeve is section secured around a section of a first tubular member. The mounting fixture, mounting sleeve, and comprising fixture sections also include an outer side which is that side of the mounting fixture which is on the outer side facing away from the tubular member when the mounting sleeve is section secured around a section of a first tubular member.

The mounting fixture of the present invention therefore connects the cooperating fixture sections together using a connection or connection element which is hidden from view in normal use, i.e. when the mounting sleeve is secured over a tubular member such as a pole. This provides an aesthetically pleasing mounting fixture appearance (for example comparable to single piece mounting fixtures such as shown in WO2009/126989A1 and Australian Design Registration No. 328482) as the fastening element is concealed from view when mounted over a tubular member. In some embodiments, this enables the mounting fixture to be configured to have a similar appearance as a unitary and/or integrally moulded mounting fixture. This can provide greater consumer acceptance of the overall connection fixture. Furthermore, the use of an internal connecting arrangement places the connection between the interconnected fixture sections within the mounting sleeve when the mounting fixture is secured over a tubular member, thereby preventing unwanted tampering with that connecting arrangement. In this respect, each connecting arrangement is typically in a location which is only accessible from the inner side of each fixture section when each fixture section is interconnected to form the mounting sleeve.

The connecting arrangement in or on each fixture section can have any suitable configuration.

In a first embodiment, the connecting arrangement comprises at least one locking formation formed on or within the inner side of each fixture section of the mounting sleeve; and at least one fastening element configured to be received on or within the inner side of each fixture section in and between cooperating locking formations of adjacent fixture sections to interconnect the adjacent fixture sections. In this embodiment, the connecting arrangement comprises a separable fastening element which is receivable in locking formations formed in the inner side of each fixture section.

The locking formation on each fixture section can have any suitable configuration. In some embodiments, the locking formation comprises a projection, flange, walls or shoulder on which a portion of the fastening element engages and can be retained. For example, where the locking element includes a retaining formation, such as a projection, spigot or barb, that retaining portion can engage and be retained by the projection, flange or shoulder of the locking formation. In a preferred form, the locking formation comprises two spaced apart projections, flanges or shoulders. Thus, where the locking element includes two retaining formations, such as a pair of projections, spigots or barbs, each retaining portion can engage and be retained by each projection, flange or shoulder of the locking formation. In alternate or additional embodiments, the locking formation comprises a recess or groove into which a portion of the fastening element, including the retaining formations, is received. The recess or groove can have a cooperative, preferable complementary shape to at least one portion of the locking element so as to retain that portion of the locking element within the locking formation. In some forms, the recess extends around a substantial portion of the inner surface of the mounting sleeve.

The fastening element is received and fitted on and/or in the inner side of the mounting sleeve of the mounting fixture and comprising fixture sections, and is thereby internally mounted within the mounting sleeve in that inner side. The fastening element can have any suitable configuration. In some embodiments, the fastening element comprises an elongate fastener, such as threaded member (e.g. a bolt, screw, pin or the like) which is received in the locking formations to interconnect the cooperating fixture sections. In other embodiments, the fastening element comprises a key which is fitted in or into the cooperating locking formations of each fixture section to interconnect the adjacent fixture sections.

Each fastening element preferably includes at least two spaced apart retaining formations configured, in use, to engage and be retained by the cooperating locking formation of each fixture section. In this respect, the fastening element includes a first retaining formation configured to be retained by a cooperating locking formation of a first fixture section, and a second retaining formation configured to be retained by a cooperating locking formation of a second fixture section. The first and second fixture sections comprise adjacent and cooperating fixture sections which are interconnected to form the mounting element of the present invention. The fastening element can include two spaced apart pairs of retaining elements. In this respect, the fastening element includes a first pair of retaining formations configured to be retained by a cooperating locking formation of a first fixture section, and a second pair of retaining formations configured to be retained by a cooperating locking formation of a second fixture section.

The retaining formations can have any suitable configuration. For example, the retaining formations may comprise at least one projection, flange, barb or spigot. In some embodiments, the fastening element includes a bridging section which interconnects and extends between the spaced apart retaining formations. The bridging section preferably comprises an elongate member. Furthermore, the retaining formations preferably extend outwardly of the bridging section. More preferably, the elongate bridging section includes a longitudinal axis extending along the length of the bridging section. The retaining formation preferably extend generally perpendicularly of that longitudinal axis. A large number of shaped elements can be used for this type of fastening element. Suitable shapes include U-shaped, C-shaped, W-shaped, S-shaped or H-shaped elements. In a preferred embodiment, the fastening element comprises an H-shaped element.

In a second embodiment, the connecting arrangement comprises at least two releasably interengageable locking elements. In these embodiments, the connecting arrangement is formed from interengageable locking elements formed on, within or with the inner side of each fixture section.

In some forms, the interengageable locking elements comprise a cooperative groove and rib formation, preferably elongate groove and elongate rib formation that extend substantially parallel to a central axis of the overall mounting sleeve (i.e. running down the center of the mounting sleeve when both fixture sections are interconnected to form the mounting sleeve). It should be appreciated that the groove can comprise a recess, trench, notch, slit, furrow, flute, canal, rut or other similar depression. Similarly, the rib can comprise a flange, projection, rail, strip, spoke, bar or other similar elongate protrusion. The groove is typically located within a flange or other body that is formed or fixed to an inner side of one fixture section. That flange is configured to extend over the rib which is typically formed on the inner side of the cooperating fixture section and cooperative seat the rib within the groove. Engagement and seating of the rib within the groove cooperatively engages the adjoining sides of the first and second fixture sections. It should be appreciated that the rib and groove can have any suitable cooperative shape. In some formed that rib and groove have a polygon shaped lateral cross-section, for example square, triangle, hexagonal or the like. In other embodiments, the rib and groove have a round or hemi-circular or semi-circular lateral cross-section.

In other forms, each locking element preferably includes at least one locking finger configured to interengage with a cooperating locking finger of the locking element of a cooperating fixture section of the mounting sleeve. The locking elements can include any number of locking fingers.

In some embodiments, the locking element includes 2, 3, 4 or 5 spaced apart fingers. Each locking element preferably includes at least two spaced apart locking fingers.

Each locking finger preferably extends substantially perpendicularly from a connector member. In some embodiments, the connector member comprises an elongate bar. Each locking finger is preferably longitudinally spaced apart along the length of this connector member.

In some embodiments, each locking finger includes, preferably forms a locking recess with or within the inner side of each fixture section configured to receive and seat a cooperating locking finger of the locking element of a cooperating fixture section of the mounting sleeve. In applicable embodiments, the locking recess is also bounded by a portion of the connector member of the respective locking finger.

The locking fingers can have any suitable shape. In preferred embodiments, the locking finger comprises an extending section which extends radially or circumferentially (relative to the fixture section) out and across connection edge of the respective fixture member. It should be appreciated that the connection edge is that edge or end of the respective fixture section which abuts or engages with the corresponding connection edge is that edge or end of the adjoining fixture section when forming the mounting fixture. Each locking finger preferably includes a locking end configured to interlock into the locking recess and resist radial or circumferential disengagement of the respective joined or connected fixture sections. The locking end can have any suitable formation. In preferred forms the locking end comprises a retaining formation, such as a projection, spigot or barb, that retaining portion can engage and be retained respective locking recess. In some embodiments, the locking end comprises a member extending an angle, preferably about 90 degrees from the end of the extending section of the finger. Various configurations are suitable. For example, in embodiments the locking finger of each locking element has a T-shape, U-shape, V-shape or L-shape.

In some embodiments, the fastening element is configured to be wedged or compressed (a compression force applied) between the outer surface of a tubular member and the inner side of the mounting sleeve when the mounting sleeve configured is secured around a section of the tubular member. This configuration may a result of a selected shape or dimension of the fastening element. Preferably, the fastening element is sized, preferably has a thickness, which enables the fastening element to be wedged or compressed between the outer surface of a tubular member and the inner side of the mounting sleeve when the mounting sleeve configured is secured around a section of the tubular member.

In some embodiments, each fixture section forming the mounting fixture has the same configuration. In this sense, only one configuration of fixture section needs to be manufactured, with each mounting fixture being formed from two identical fixture section pieces. In embodiments, this is possible by designing the fixture section to be rotatably symmetrical. Thus, all the features required of a fixture section must also be present when that fixture section is rotated 180 degrees.

In other embodiments, the mounting fixture is formed from two different configurations of fixture sections. Preferably, the mounting fixture is formed from two fixture sections which comprise mirror image configurations.

The first connection section and second connection section can have any suitable configuration. In one embodiment, the connection sections comprise a protrusion. In a preferred embodiment, each of the first connection section and second connection section comprise at least one flange. More preferably, the first connection section comprises two spaced apart flanges, and the second connection section comprises a single flange configured to be received in between the flanges of the first connection section.

In some embodiments, the first connection section comprises an angled flange, the flange extending and sloping axially (relative to the longitudinal axis of the mounting fixture) away from the outer side of each fixture section. In some embodiments, the first connector section axially extends over the top edge of the mounting sleeve of the mounting fixture, positioning the first connection aperture axially over the top edge of the mounting sleeve.

The connecting arrangement can be provided in any suitable location in each fixture section. Suitable locations typically enable the fastening element to be fitted into the connecting arrangement of each adjacent fixture section, and for the bridging section of that connecting arrangement to extend between the fixture sections. The connecting arrangement is therefore preferably located in or on the mounting sleeve portion of each fixture section. More preferably, the connecting arrangement is situated on an end, preferably a radial end of the fixture section. For example, in those embodiments where each fixture section comprises a generally half tubular section having a central axis, the connecting arrangement is preferably located at one radial end relative to the central axis. A portion of the first connection section of the mounting fixture is preferably located on the opposite radial end relative to the central axis. Where the first connection section comprises two spaced apart flanges, each fixture section would preferably include one flange of that first connection section.

In some embodiments, the connecting arrangement is formed in a fastening section of the fixture section which includes a surface which abuts a fastening section of the cooperating fixture section when the respective fixture sections are interconnected by the fastening element.

The mounting fixture is configured to be fitted and retained around and on a tubular member. The mounting fixture therefore can include at least one fixing aperture for fixing the respective mounting fixture to the first tubular member. The fixing aperture or apertures are preferably located in the mounting sleeve portion of the fixture section. In some embodiments, the mounting fixture includes at least two fixing apertures. Preferably, each fixing element includes at least one fixing aperture, preferably at least two fixing apertures. The fixing aperture(s) preferably comprises at least one of:

a threaded fixing aperture configured to receive a threaded fastener for friction fitting the respective mounting fixture or receiving element to the respective first tubular member or second tubular member; or at least one mechanical fixing aperture configured to receive a fixing element which forms a mechanical connection between the respective mounting fixture or receiving element to the respective first tubular member or second tubular member.

A second aspect of the present invention provides a connection fixture for interconnecting at least two tubular members, the connection fixture including:

a mounting fixture according to the first aspect of the present invention configured to be secured around a section of a first tubular, the mounting fixture including at least one first connection section including a first connection aperture;

at least one receiving element configured to receive an end section of a second tubular member, each receiving element including a second connection section including a second connection aperture; and at least one connector configured to be received through the first connection aperture and the second connection aperture of at least one of the receiving elements to secure that receiving element to the mounting fixture, and allow the at least one receiving element to pivot relative to the mounting fixture.

The mounting fixture and receiving elements can have any shape or configuration. In a preferred form, each of the mounting fixture and receiving elements include substantially tubular bodies including a central axis.

Again, the first connection section and second connection section can have any suitable configuration. In one embodiment, the connection sections comprise a protrusion. In a preferred embodiment, each of the first connection section and second connection section comprise at least one flange. More preferably, the first connection section comprises two spaced apart flanges, and the second connection section comprises a single flange configured to be received in between the flanges of the first connection section. In this embodiment, the connector extends perpendicularly through the first connection aperture and second connection aperture relative to the flanges providing a pivot about which the mounting fixture and receiving element can pivot relative to one another.

The connector can comprise any suitable connector or fastening arrangement which can extend through and connect the first connection section and the second connection section. In one embodiment, the connector comprises a nut and bolt arrangement, the nut including an elongate shaft which extends through the apertures of the first connection section and the second connection section. Where the first connection section and the second connection section comprise a flange, nut of the connector can in some embodiments be mounted to, fixed to, or integrally formed with one of the flanges of the first connection section. In use, this enables easy assembly of the respective receiving element to the mounting element, as the user does not need to manipulate both the bolt and nut.

Some embodiments of the connection fixture according to the present invention can be configured to mount a receiving element thereon in a number of different locations. Accordingly, some embodiments of the connection fixture include a mounting fixture that includes at least two first connection sections. These embodiments could include at least two receiving elements. Each receiving element would be configured to receive an end section of a tubular member and could be fastened to the mounting fixture using a cooperating connector. Accordingly, the position of each of the at least two receiving elements could be selected to suit a particular connection configuration between three or more tubular members.

The connection fixture of the present invention can be used to connect a variety of different types of tubular members. Suitable tubular members include metal or wooden members including poles, posts, struts, beams, sections, arches or the like. In a preferred embodiment, each of the tubular members comprises tubular poles. The tubular poles could have any suitable cross-section including circular, square, rectangular or the like.

In a third aspect of the present invention, there is provided mounting fixture of a connection fixture for interconnecting at least two tubular members. The mounting fixture comprises at least two interconnectable fixture sections, each fixture section comprising a portion of the mounting fixture, and including at least one connecting arrangement formed on or within the inner side of each fixture section of the mounting fixture to interconnect the adjacent fixture sections.

It should be appreciated that the mounting fixture of the third aspect of the present invention could include any of the above described features of the first or second aspect of the present invention.

BRIEF DESCRIPTION OF THE DRAWINGS

The present invention can now be described with reference to the figures of the accompanying drawings, which illustrate particular preferred embodiments of the present invention, wherein:

FIG. 1A is an isometric view of a connection fixture which includes a mounting fixture according to a first embodiment of the present invention.

FIG. 1B is an isometric view of a connection fixture of FIG. 1A with tubular pipes received therein.

FIG. 2 is an isometric view of a connector section according to a first embodiment of the present invention which forms part of the mounting fixture of the connection fixture shown in FIG. 1A.

FIG. 3 is an isometric view of a mounting fixture according to the first embodiment of the present invention which can form part of the connection fixture of FIG. 1A.

FIGS. 4A and 4B is a plan and side view of the fastening element used to interconnect the fixture sections of the mounting element shown in FIG. 3.

FIG. 5 is an isometric view of a receiving element of the connection fixture shown in FIG. 1A.

FIG. 6A to 6D show sectional views of the mounting fixture shown in FIG. 2.

FIGS. 9A and 9B provide isometric views of (9A) a mounting fixture and (9B) fixture sections according to a fourth embodiment of the present invention which can form part of the connection fixture of FIG. 1A.

FIG. 10 is an isometric view of a two way mounting fixture formed from two stacked mounting fixtures shown in FIG. 9A.

FIGS. 13A and 13B provide isometric views of (13A) a mounting fixture and (13B) fixture sections according to a fifth embodiment of the present invention which can form part of the connection fixture of FIG. 1A.

FIG. 14 is an isometric view of a two way mounting fixture formed from two stacked mounting fixtures shown in FIG. 13A.

DETAILED DESCRIPTION

Figure 7A:
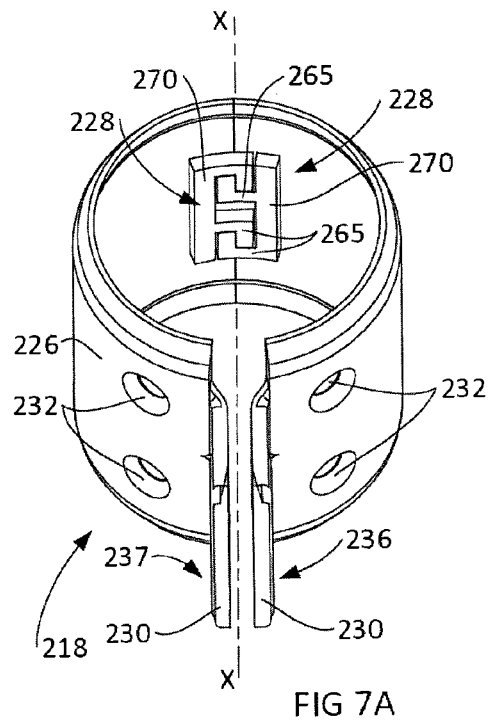
FIGS. 7A and 7B provide isometric view of (7A) a mounting fixture and (7B) fixture section according to a second embodiment of the present invention which can form part of the connection fixture of FIG. 1A.

FIGS. 1A to 6 illustrate a connection fixture 100 and parts thereof according to a first embodiment of the present invention. FIGS. 1A and 1B shows the overall assembled connection fixture. FIGS. 2 to 6 show various aspects of the component parts of the connection fixture 100. More particularly, FIGS. 2 to 4, 6 to 10 shows the features of the multipart (interconnectable two section) mounting fixture 118 according to other embodiments of the present invention.

The illustrated connection fixture 100 includes three interconnected components or sections, being a mounting fixture 118, a receiving element 120 and a connector 122.

The illustrated mounting fixture 118, in an assembled form, is a tubular collar configured to be fastened around a section of a tubular member, such as tubular pole 105 (FIG. 1B). In this regard, the mounting fixture 118 includes a tubular sleeve 126 having tubular walls 126A configured to encircle and engage with the outer surface 105A (FIG. 1B) of a tubular pole 105 received through and within a central opening 124. The tubular sleeve 126 extends substantially annularly around the outer surface 105A of a tubular pole 105 with a gap G (FIG. 3) situated between connection flanges 130 (as described below). The tubular sleeve 126 includes edge walls 127 which from a rim around the annular inner edges of the tubular sleeve 126. A groove or recess 129 is formed in the inner side 128 of the tubular sleeve 126. These edge walls 127 abut the outer surface 105A of a tubular pole 105 received within the central opening 124. The illustrated mounting fixture 118 also includes two spaced apart connection flanges 130 which extend radially outwardly relative to axis X-X of the tubular hub 126. The connection flanges 130 are spaced apart by a gap G (FIG. 3) which extends through to the tubular sleeve 126. Each flange 130 includes a first connection aperture 136, 137 which run along pivot axis Z-Z configured to receive the connector 122 therethrough. The illustrated first connection aperture 136, 137 have a diamond shaped aperture designed to receive a correspondingly shaped hub formed on at least one cooperating ends of connector 122. This shape is intended to fix the connector 122 in the first connection apertures 136, 137, and therefore prevent the connector 122 rotating in the first connection apertures 136, 137.

As best shown in FIG. 1, the tubular sleeve 126 of the mounting fixture 118 includes four fixing apertures 132. These fixing apertures 132 could be threaded fastening holes through which a flat headed threaded fastener can be inserted to fasten the mounting fixture 118 to a tubular pole 105 received within the central opening 124. This threaded fastener friction fits the respective mounting fixture 118 to that tubular pole 105. These fixing apertures 132 could also be mechanical fixing holes provided to insert a fixing element (tek screw, bolt, weld or similar) which forms a mechanical connection between the respective mounting fixture 118 to that tubular pole 105.

As shown in FIGS. 1 and 5, the receiving element 120 is a cup shaped body having a hemispherical end 140 and an opening 142 at the other end 144. Central axis Y-Y (FIG. 5) runs through the centre of the receiving element 120. The receiving element 120 also includes a sleeve section 147 configured to receive and seat an end section of a tubular member, such a pole 106 (FIG. 1B). In this respect, an end section of a pole 106 can be inserted through the opening 142 and seated within the sleeve section 147. The hemispherical end 140 includes a flange 145 which extend perpendicularly from the outer surface of the apex of the hemispherical end 140. The flange 145 includes a second connection aperture 146 configured to receive the connector 122 therethrough. This connection aperture 146 is circular, designed to allow the receiving element 120 to pivot on connector 122 (which has a circular cross-section at the point the connector aperture mounts on the connector 122). The flange 145 is configured to be received between the spaced apart flanges 130 of the mounting fixture 118.

Like the mounting fixture 118, the sleeve section 147 of the receiving element 120 includes a fixing aperture 154, comprising either a threaded fastening hole or mechanical fixing holes similar as described above for the mounting element 118.

The connector 122 (best shown in FIG. 1) is used to fasten the receiving element 120 to the mounting fixture 118. Whilst not clearly shown in the figures, it should be understood that the illustrated connector 122 is a bolt and nut fastener which includes an elongate threaded central shaft having a substantially hemispherical bolt head 155 at one end and a substantially hemispherical retaining nut 156 which fastens over the distal end of the elongate central shaft. The threaded shaft cooperates with a retaining nut 156 to form a clamping end for the connector 122. The connector 122 acts as a pivot about and around which the mounting fixture 118 and receiving element 120 can move relative to each other.

FIGS. 2, 3, 4 and 6 show that the mounting fixture 118 of the illustrated connection fixture 110 is formed of two symmetrical fixture sections 160. Each fixture sections 160 comprise half of the mounting fixture 118. Each fixture sections 160 is rotatably (180 degrees) symmetrical relative to the other fixture section 160 enabling a single fixture section mould to be used for both fixture sections. The two fixture sections 160 are interconnectable using a H-shaped fastening element 170 to form the mounting fixture 118 as shown in FIG. 3.

FIGS. 2 and 6 illustrate one fixture section 160. Each fixture section 160 comprising one half of the mounting fixture 118, providing a generally half tubular section having a central axis X-X corresponding to the central axis X-X of the mounting element 118. A locking formation 165 is located at one radial end relative to the central axis X-X. Additionally, one flange of the pair of flange connector 130 of the mounting fixture 118 is located on the opposite radial end relative to the central axis X-X.

The locking formation 145 is formed on or within the inner side 128 of each fixture section 160. The illustrated locking formation comprises a slot 166 formed in flange or inner wall 167. The inner wall 167 provides engagement surfaces/shoulders 168 either side of the slot 166 against which retaining formation of the fastening element 170 can engage and be retained. End fastening surfaces 169 are also provided which interengage and abuts when the respective fixture sections 160 are interconnected by the fastening element 170.

As best shown in FIGS. 3 and 4, the two fixture sections 160 are interlocked/interconnected together using the H-shaped fastening element 170. FIG. 4(B) shows the fastening element 170 has a slight longitudinal curve, matching the annular curve of the internal/inner section of the mounting sleeve 126 in which it is received and fitted. The fastening element 170 is also configured to be received in and between cooperating locking formations 145 of adjacent fixture sections 160 to interconnect the adjacent fixture sections 160. The legs 172 of the H-shaped element form protrusions or flanges which abut against the engagement surfaces 168 either side of the slot 166 and are retained therein (FIG. 3). The fastening element 170 also includes bridging section 174 which extends between the legs 172. This H-shaped fastening element 170 is therefore concealed from view and access from the outer side of the tubular sleeve 126 when the mounting fixture 118 is secured over a tubular member.

In preferred embodiments, the fastening element 170 has a thickness which is substantially the same or slightly greater than the height of the inner wall 167. The fastening element 170 therefore abuts the outer surface 105A of a tubular pole 105 (FIG. 1B) received within the central opening 24. This assists in retaining the fastening element 170 in place when the mounting fixture 118 is fitted over a tubular pole 105 as the fastening element 170 is wedged between the outer surface of a tubular pole 105 and the inner surface/side 128 of the tubular sleeve 126. This wedged engagement between the outer surface of a tubular pole and the inner surface/side 128 of the tubular sleeve 126 is generally further tightened/increased when a threaded fastener or a fixing element (tek screw, bolt, weld or similar) is used in conjunction with fixing apertures 132 mounting fixture 118 to more securely mount the mounting element 118 to that tubular pole 105.

The mounting fixture 118 is assembled by placing two symmetrically arranged fixture sections 160 together, with the two corresponding end engagement surfaces 169 abutting. The fastening element 170 is then fitted into the cooperative and adjacent locking formations 165 of each fixture section 160 to interlock the fixture sections 160 together. As shown in FIG. 3, this provides a mounting element 118 joined across the locking formations 165 on one side, and having the spaced apart fastening flanges 130 on the other. The fastening flanges 130 are interconnected once the receiving element 120 and connector 122 are connected to the mounting fixture 118.

The mounting fixture 118, receiving element 120 and connector 122 are assembled to form the connection fixture 110 by inserting the flange 145 of the receiving element 120 between the flanges 130 of the mounting fixture 118 and aligning the first and second connection apertures. The connector 122 is then inserted into the first 136, 137 and second 146 connection apertures, and into the retaining nut 156 is tightened so as to clamp the receiving element 120 to the mounting fixture 118.

It should be appreciated that the mounting fixture 118 could include any number of pairs of spaced apart flanges 150, 152 attached and spaced apart around the periphery of the mounting fixture 118 for attaching multiple receiving elements 120.

Each of the mounting fixture 118, receiving element 120 and connector 122 can be manufactured using a number of different techniques. The components of the illustrated embodiment are pressure cast products, produced using suitable injection die casting techniques. However, it should be appreciated that the components could be manufactured using other techniques such as stamping, pressing techniques or the like.

FIGS. 7 to 10 illustrate three alternate embodiments of mounting fixtures 218, 318 and 418 that can be used as part of the connection fixture 100 shown in FIGS. 1A and 1B. It should be appreciated that these mounting fixtures 218, 318 and 418 can be substituted for the mounting fixture 118 shown in that Figure and the description of use and the other component parts, i.e. receiving element 120 and connector 122 are the same as previously described.

Figure 7B:
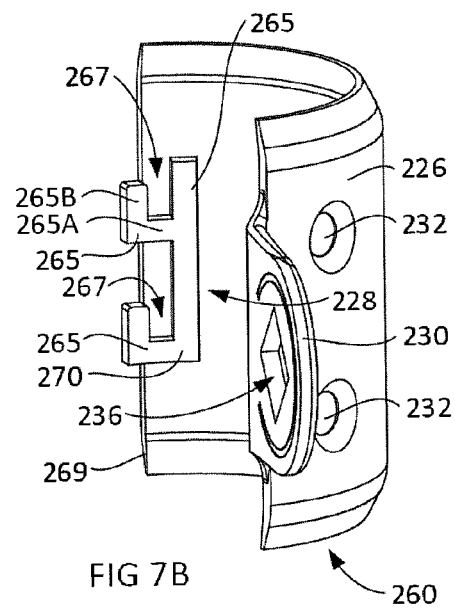

Firstly turning to the second embodiment of the mounting fixture 218 illustrated in FIGS. 7(A) and 7(B). This mounting fixture 218 is similarly formed from two symmetrical fixture sections 260 (one of which is shown in FIG. 7(B)). Each fixture sections 260 comprise half of the mounting fixture 218. Each fixture sections 260 is rotatably (180 degrees) symmetrical relative to the other fixture section 260 enabling a single fixture section mould to be used for both fixture sections. In this embodiment the two fixture sections 260 are interconnectable using a two fingered comb connecting arrangement 270 to form the mounting fixture 218 as shown in FIG. 7(A).

FIG. 7(B) illustrates one fixture section 260. Each fixture section 260 comprising one half of the mounting fixture 218, providing a generally half tubular section having a central axis X-X corresponding to the central axis X-X of the mounting element 218. The comb connecting arrangement 270 is located at one radial end relative to the central axis X-X. Additionally, one flange of the pair of flange connector 230 of the mounting fixture 218 is located on the opposite radial end relative to the central axis X-X.

The comb connecting arrangement 270 is formed on or within the inner side 228 of each fixture section 260. The illustrated comb connecting arrangement 270 comprises a connector strip 264 from which extends two axially (relative to axis X-X) spaced apart fingers 265 which extend in the radial or circumferential diction across the fastening edge 268 of each fixture section 260. Each finger 265 comprises two portions, namely a first radially/circumferentially extending section 265A and an axially extending locking portion 265B, Each finger therefore comprises a L-shape extending from the connector strip 264. Each finger also forms a locking recess 267 bounded between the connector strip 264, the respective extending section 265A, locking portion 265B and proximate inner side 228 of the fixture section 260. Each locking recess 267 is sized and shaped to receive a cooperating locking finger 265 of an adjoining fixture section 260 (see for example FIG. 7(A). It should be appreciated that the comb connecting arrangement 270 can be formed in or integrally with the inner side 228 of each fixture section 260, or could be fixed, for example welded thereto, as a separately formed part.

As best shown in FIG. 7(A), the two fixture sections 260 are interlocked/interconnected together by interlocking cooperating locking fingers 265 of an adjoining fixture section 260. Here, each locking fingers 265 is received and locked into a cooperating locking recess 267 of the other fixture sections 260. The inner side 228 location of the comb connecting arrangement 270 ensures that it is concealed from view and access from the outer side of the tubular sleeve 226 when the mounting fixture 218 is secured over a tubular member.

In preferred embodiments, the connecting arrangement 270 has a thickness which is substantially the same or slightly greater than the height of the inner wall 167. The connecting arrangement 270 therefore abuts the outer surface 105A of a tubular pole 105 (FIG. 1B) received within the central opening 24. This assists in retaining the connecting arrangement 270 in place when the mounting fixture 218 is fitted over a tubular pole 105 as the connecting arrangement 270 is wedged between the outer surface of a tubular pole 105 and the inner surface/side 228 of the tubular sleeve 226. This wedged engagement between the outer surface of a tubular pole and the inner surface/side 228 of the tubular sleeve 226 is generally further tightened/increased when a threaded fastener or a fixing element (tek screw, bolt, weld or similar) is used in conjunction with fixing apertures 232 of mounting fixture 218 to more securely mount the mounting element 218 to that tubular pole 105.

The mounting fixture 218 is assembled by placing two symmetrically arranged fixture sections 260 together, with two corresponding end engagement surfaces 269 of fastening edges 268 abutting. The fingers 265 of each comb connecting arrangement 270 are then fitted into the cooperating locking recess 267 of the other fixture sections 260 to interlock the fixture sections 260 together. As shown in FIG. 7A, this provides a mounting element 218 joined across the comb connecting arrangement 270 on one side, and having the spaced apart fastening flanges 230 on the other. The fastening flanges 230 are interconnected once the receiving element 120 and connector 122 (FIGS. 1A and 5) are connected to the mounting fixture 218.

The mounting fixture 218, receiving element 120 and connector 122 are assembled to form the connection fixture 110 shown in FIGS. 1A and 1B by inserting the flange 145 of the receiving element 120 between the flanges 230 of the mounting fixture 218 and aligning the first and second connection apertures. The connector 122 is then inserted into the connection apertures 236, 237, and into the retaining nut 156 is tightened so as to clamp the receiving element 120 to the mounting fixture 218.

Figure 8A:
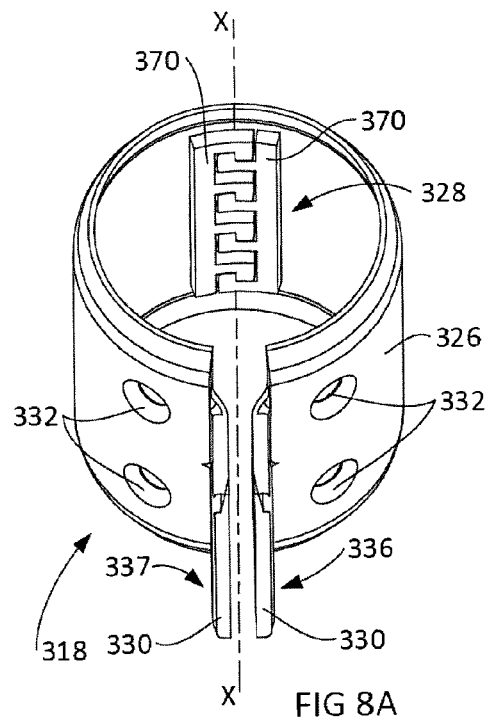
FIGS. 8A and 8B provide isometric views of (8A) a mounting fixture and (8B) fixture section according to a third embodiment of the present invention which can form part of the connection fixture of FIG. 1A.
Figure 8B:
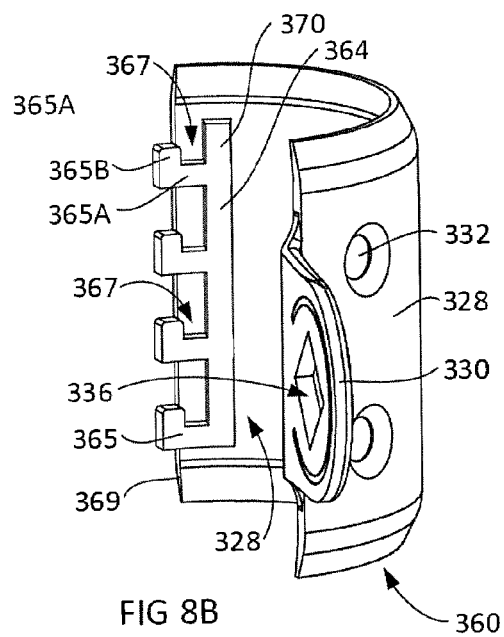

It should be appreciated that the comb connecting arrangement 270 can have any number of fingers 265. Whilst FIGS. 7(A) and 7(B) illustrate a four fingered comb connecting arrangement 270, any number of fingers such as three, four, five etc. could be used. For example, FIGS. 8(A) and 8(B) illustrate a four fingered 365 comb fastening element 370. It should be appreciated that this third embodiment includes all the same features as described for the second embodiment in relation to FIGS. 7(A) and 7(B) and therefore the above description of the second embodiment equally applies to this third embodiment. In this respect, the same reference numbers have been used for this third embodiment as used for the second embodiment PLUS 100.

The fourth embodiment of the mounting fixture 418 of the present invention is illustrated in FIGS. 9(A) and 9(B). This mounting fixture 418 is formed from two fixture sections 460A and 460B as shown in FIG. 9(B). However, in this case the fixture sections are not symmetrical but rather are mirror images of each other due to the axially angled connector flange 430A and 430B. Nevertheless, like the previous embodiments each fixture sections 460A and 460B comprise half of the mounting fixture 418 and are interconnectable using a fingered connecting arrangement 470 to form the mounting fixture 418 as shown in FIG. 9(A). In this case, the connecting arrangement 470 has a single connecting finger.

FIG. 9(B) illustrates each fixture section 460A and 460B. Each fixture section 460A and 460B comprises a generally half tubular section having a central axis X-X corresponding to the central axis X-X of the mounting element 418. The connecting arrangement 470 is located at one radial end relative to the central axis X-X. Additionally, one flange of the pair of flange connector 430A and 430B of the mounting fixture 418 is located on the opposite radial end relative to the central axis X-X.

Like the previous embodiments, the connecting arrangement 470 is formed on or within the inner side 428 of each fixture section 460A and 460B. The illustrated connecting arrangement 470 comprises a connector strip 464 from which extends one axially (relative to axis X-X) fingers 465 which extend in the radial or circumferential diction across the fastening edge 468 of each fixture section 460A and 460B. Each finger 465 comprises an L-shape having two portions, namely a first radially/circumferentially extending section 465A and an axially extending locking portion 465B. Each finger also forms a locking recess 467 bounded between the connector strip 464, the respective extending section 465A, locking portion 465B and proximate inner side 428 of the fixture sections 460A and 460B. Each locking recess 467 is sized and shaped to receive a cooperating locking finger 465 of an adjoining fixture section 460. It should be appreciated that the connecting arrangement 470 can be formed in or integrally with the inner side 428 of each fixture section 460A and 460B, or could be fixed, for example welded thereto, as a separately formed part. The connecting arrangement 470 operates the same as described in relation to the comb connecting arrangements 270 and 370 of the second and third embodiments, and it should be understood that the preceding description equally applies to this embodiment.

As best shown in FIG. 9(A), the two fixture sections 460A and 460B are interlocked/interconnected together by interlocking cooperating locking fingers 465 of an adjoining fixture section 460. The inner side 428 location of the connecting arrangement 470 ensures that it is concealed from view and access from the outer side of the tubular sleeve 426 when the mounting fixture 418 is secured over a tubular member.

In this embodiment, the connection flanges 430A and 430B are axially angled relative to axis X-X such that each flange extends and sloping axially away from the outer side of each fixture section 460A and 460B. Here, each connection flange 430A and 430B extends over the top edge of the mounting sleeve 426, positioning the connection aperture 436 and 437 axially over the top edge of the mounting sleeve 426. The angled configuration of the connection flanges 430A and 430B require two different fixture section 460A and 460B to be used in order to align the connection aperture 436 and 437. Each fixture section 460A and 460B is a mirror image of the other fixture section 460B and 460A.

The mounting fixture 418 is assembled by placing the two mirror image fixture sections 460A and 460B together, with two corresponding end engagement surfaces 469 of fastening edges 468 abutting. The fingers 465 of each connecting arrangement 470 are then fitted into the cooperating locking recess 467 of the other fixture sections 460 to interlock the fixture sections 460 together. As shown in FIG. 9A, this provides a mounting element 418 joined across the connecting arrangement 470 on one side, and having the spaced apart fastening flanges 430 on the other. The fastening flanges 430A and 430B are interconnected once the receiving element 120 and connector 122 (FIGS. 1A and 5) are connected to the mounting fixture 418.

The mounting fixture 418, receiving element 120 and connector 122 are assembled to form the connection fixture 110 shown in FIGS. 1A and 1B by inserting the flange 145 of the receiving element 120 between the flanges 430A and 430B of the mounting fixture 418 and aligning the first and second connection apertures. The connector 122 is then inserted into the connection apertures 436, 437, and into the retaining nut 156 is tightened so as to clamp the receiving element 120 to the mounting fixture 418.

Two mounting fixtures 418 can be axially stacked on a tubular mounting pole or tube to form a two way mounting fixture 500. Here two mounting fixtures 418 shown in FIG. 9 are arranged with the angled connector flanges 430A and 430B extending over the adjacent stacked mounting fixture 418. This generally radially aligns the location of the connection apertures 436, 437, of the two mounting fixtures 418, allowing the two the receiving element 120 to be radially aligned when attached to each mounting fixture, and thus form an effective two way connector. Whilst the illustrated embodiment (FIG. 10) shows the flanges 430A and 430B of each mounting fixtures 418 180 degrees apart, it should be appreciated that these could be arranged at any angle, say for example 90 degrees to form a corner fixture or similar.

FIGS. 11 to 14 illustrate yet another alternate embodiment of mounting fixture 518 that can be used as part of the connection fixture 100 shown in FIGS. 1A and 1B. It should be appreciated that this mounting fixtures 518 can be substituted for the mounting fixture 118 shown in that FIGS. 1A and 1B) and the description of use and the other component parts, i.e. receiving element 120 and connector 122 are the same as previously described.

Figure 11:
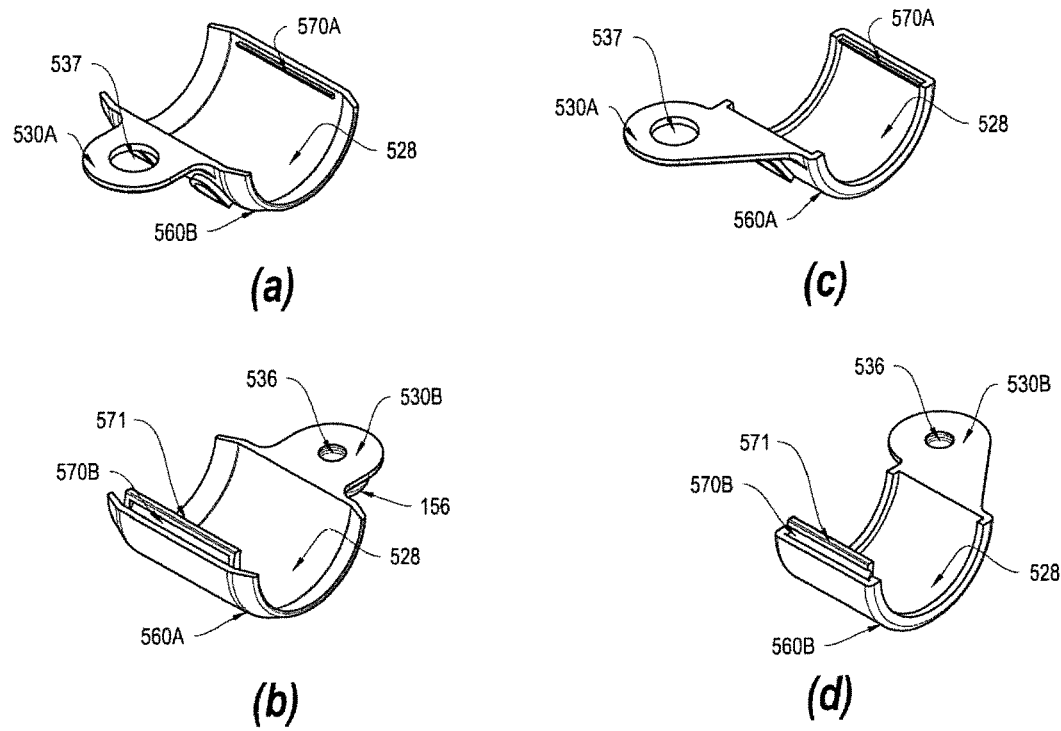
FIG. 11 provides four isometric views of fixture sections which form mounting fixtures according to a fifth embodiment of the present invention.

The fifth embodiment of the mounting fixture 518 of the present invention is illustrated in FIGS. 11 to 14. This mounting fixture 518 is formed from two fixture sections 560A and 560B as shown in FIG. 11. However, in this case the fixture sections 560A and 560B are not symmetrical or mirror images of each other due to differing configuration of the rib and groove connecting arrangement 570 on the respective fixture sections. Nevertheless, like the previous embodiments each fixture sections 560A and 560B comprise half of the mounting fixture 518 and are interconnectable using the rib and groove connecting arrangement 570 to form the mounting fixture 518 as shown in FIG. 13(A).

Figure 12:
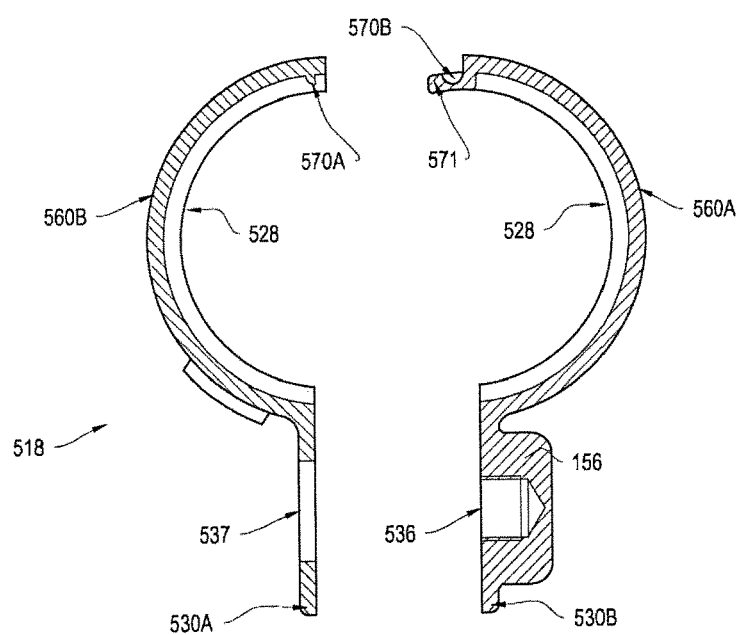
FIG. 12 is a top cross-sectional view of aligned fixture sections shown in FIGS. 11(a) and 11(b) taken laterally through the connection aperture.

FIGS. 11, 12 and 13B illustrate each fixture section 560A and 560B. It is noted that FIGS. 11(a) and (b) provide a first set of cooperating fixture sections 560A and 560B and FIGS. 11(c) and (d) provide a second set of cooperating fixture sections 560A and 560B of this embodiment. Each fixture section 560A and 560B comprises a generally half tubular section having a central axis X-X corresponding to the central axis X-X of the mounting element 518. One of the cooperating rib 570A or groove 570B connecting arrangement 570 is located at one radial end relative to the central axis X-X. Additionally, one flange of the pair of flange connector 530A and 530B of the mounting fixture 418 is located on the opposite radial end relative to the central axis X-X. In FIGS. 11(a) and 11(b), the pair of flange connector 530A and 530B which extend generally outwardly relative to the central axis X-X. In FIGS. 11(c) and 11(d), the pair of flange connector 530A and 530B comprises axially angled connector flanges similar to those described in relation to the fourth embodiment.

Like the previous embodiments, the connecting arrangement 570 is formed on or within the inner side 528 of each fixture section 560A and 560B. The illustrated connecting arrangement 570 comprises a cooperating locking groove 570B and locking rib 570A. The locking groove 570B comprises an elongate recess formed in a flange or similar body 571 formed or fixed to the inner-side of the respective fixture section 560A, designed to extend across the edge or end of the fixture section and extend over and cooperative seat on the cooperative locking rib 570A of an adjoining fixture section 560 (see FIGS. 12 and 13A). Each locking groove 570B is sized and shaped to receive a cooperating locking rib 570A of the adjoining fixture section 560. It should be appreciated that the locking groove 570B and the locking rib 570A can have any suitable cooperative shape. In some forms, the locking groove 570B and the locking rib 570A can have a polygon shaped lateral cross-section, for example square, triangle, hexagonal or the like. In the illustrated embodiment, locking groove 570B and locking rib 570A have a round or hemi-circular or semi-circular lateral cross-section.

The locking groove 570B of fixture section 560A shown in FIGS. 11(b) and 12 includes stops at each end of the groove 570B to prevent the co-operating locking rib 570A sliding (axially i.e. parallel to axis X-X) out from the groove 570B when the fixture sections 560A and 560B are joined together. Stops are formed by end flanges that locking rib 570A of fixture section 560A shown in FIGS. 11(c), 13A, 13B and 14 to provide a similar function of preventing the locking rib 570A sliding (axially i.e. parallel to axis X-X) out from the co-operating groove 570B when the fixture sections 560A and 560B are joined together.

It should be appreciated that the connecting arrangement 570 can be formed in or integrally with the inner side 528 of each fixture section 560A and 560B, or could be fixed, for example welded thereto, as a separately formed part.

As best shown in FIG. 9(A), the two fixture sections 560A and 560B are interlocked/interconnected together by aligning the locking groove 570B and the locking rib 570A and then seating the flange 571 over the locking rib 570A so that the locking rib 570A is seated in the locking groove 570B of an adjoining fixture section 560. The inner side 528 location of the connecting arrangement 570 ensures that it is concealed from view and access from the outer side of the tubular sleeve 526 when the mounting fixture 518 is secured over a tubular member.

As noted above, the connection flanges 530A and 530B can be axially angled relative to axis X-X such that each connection flange 530A and 530B extends and slopes axially away from the outer side of each fixture section 560A and 560B (see for example FIGS. 13A, 13B and 14). In that form (FIGS. 11(c) and 11(d)) each connection flange 530A and 530B extends over the top edge of the mounting sleeve 526, positioning the connection aperture 536 and 537 axially over the top edge of the mounting sleeve 526. The angled configuration of the connection flanges 530A and 530B and the use of a cooperative rib and groove connection arrangement 570 require two different fixture section 560A and 560B to be used.

The mounting fixture 518 is assembled by placing the fixture sections 560A and 560B together, with two corresponding end engagement surfaces 569 of fastening edges 568 abutting. The cooperative rib and groove connection arrangement 570 of the fixture sections 460 are engaged to interlock the fixture sections 560A and 560B together. As shown in FIG. 13A, this provides a mounting element 518 joined across the connecting arrangement 570 on one side, and having the spaced apart fastening flanges 530 on the other. The fastening flanges 530A and 530B are interconnected once the receiving element 120 and connector 122 (FIGS. 1A and 5) are connected to the mounting fixture 518. It is noted that in the illustrated embodiment, retaining nut 156 is fixed or integrally formed with fastening flange 530B.

The mounting fixture 518, receiving element 120 and connector 122 are assembled to form the connection fixture 110 shown in FIGS. 1A and 1B by inserting the flange 145 of the receiving element 120 between the flanges 530A and 530B of the mounting fixture 518 and aligning the first and second connection apertures. The connector 122 is then inserted into the connection apertures 536, 537 (FIG. 12), and into the retaining nut 156 is tightened so as to clamp the receiving element 120 to the mounting fixture 518.

As shown in FIG. 14, two mounting fixtures 518 can be axially stacked on a tubular mounting pole or tube to form a two way mounting fixture 600. Here two mounting fixtures 518 shown in FIG. 13A are arranged with the angled connector flanges 530A and 530B extending over the adjacent stacked mounting fixture 518. This generally radially aligns the location of the connection apertures 536, 537, of the two mounting fixtures 518, allowing the two the receiving element 120 to be radially aligned when attached to each mounting fixture, and thus form an effective two way connector. Whilst the illustrated embodiment (FIG. 14) shows the flanges 530A and 530B of each mounting fixtures 518 180 degrees apart, it should be appreciated that these could be arranged at any angle, say for example 90 degrees to form a corner fixture or similar.

The illustrated connection fixture 110 can replace most existing standard fittings, such as tee fixtures, cross fixtures and corner fixtures in barrier structures such as fences, balustrades, railings, hand rails, or the like. In this respect, a user can use the adjustability of the connection fixture 110 to move to the receiving element 120 at a selected angle relative to the respective mounting fixture 118, 218, 318, 418, 500, 518, 600 corresponding to the equivalent tee fixture, cross fixture and/or corner fixture.

Those skilled in the art can appreciate that the invention described herein is susceptible to variations and modifications other than those specifically described. It is understood that the invention includes all such variations and modifications which fall within the spirit and scope of the present invention.

Throughout the description and claims of the specification the word "comprise" and variations of the word, such as "comprising" and "comprises", is not intended to exclude other additives, components, integers or steps.

We claim:

1. A connection fixture for interconnecting at least two tubular members including a first tubular member and a second tubular member, the connection fixture comprising:
    a mounting fixture according configured to be secured around a section of the first tubular member, the mounting fixture comprising:
        at least one first connection section including a first connection aperture,
        a mounting sleeve configured to be secured around a section of a tubular member, the mounting sleeve comprising at least two interconnectable fixture sections, each comprising a portion of the mounting fixture that includes a section of the mounting sleeve and a portion of the first connection section, and
        a connecting arrangement configured to interconnect adjacent fixture sections to form the mounting sleeve, the connecting arrangement being located on an inner side of each fixture section of the mounting sleeve to interconnect each fixture section to an adjoining fixture section at a location on an inner side of the mounting sleeve;
    at least one receiving element configured to receive an end section of the second tubular member, each receiving element comprising a second connection section including a second connection aperture; and
    at least one connector configured to be received through the first connection aperture and the second connection aperture of at least one of the receiving elements to secure that receiving element to the mounting fixture via the second connection aperture, and allow the at least one receiving element to pivot relative to the mounting fixture;
    wherein the connecting arrangement comprises at least one cooperating pair of a groove locking element and a rib locking element that are releasably interengageable, at least one of the rib locking element or the groove locking element being formed on a flange extending along an inner side of a fixture section that is configured to extend over a cooperating rib locking element or groove locking element formed on the inner side of the adjacent fixture section; and
    wherein the fixture sections connect together using the connecting arrangement, and enclose the connecting arrangement in an internal location within the mounting sleeve when the mounting sleeve is mounted over a cooperating tubular member.

2. The connection fixture according to claim 1, wherein each of the rib locking element and the groove locking element has a square, triangular, or hexagonal lateral cross-sectional shape.

3. The connection fixture according to claim 1, wherein each of the rib locking element and the groove locking element has a round, hemi-circular, or semi-circular lateral cross-sectional shape.

* * * * *